(12) United States Patent
Magnuson

(10) Patent No.: US 8,911,661 B2
(45) Date of Patent: Dec. 16, 2014

(54) CUTTING APPARATUS WITH TWO TORCHES

(75) Inventor: James M. Magnuson, Kankakee, IL (US)

(73) Assignee: Peddinghaus Corporation, Bradley, IL (US)

( * ) Notice: Subject to any disclaimer, the term of this patent is extended or adjusted under 35 U.S.C. 154(b) by 198 days.

(21) Appl. No.: 13/440,806

(22) Filed: Apr. 5, 2012

(65) Prior Publication Data

US 2013/0264752 A1 Oct. 10, 2013

(51) Int. Cl.
*B23K 7/00* (2006.01)

(52) U.S. Cl.
USPC .............................. 266/77; 266/48

(58) Field of Classification Search
CPC ........ B23K 7/06; B23K 7/10; B23K 37/0211; B23K 26/0853
USPC .................................... 266/48, 77
See application file for complete search history.

(56) References Cited

U.S. PATENT DOCUMENTS

| 2,596,951 | A | 11/1946 | Carpenter et al. |
| 5,256,212 | A | 10/1993 | Magnuson |
| 5,833,126 | A | 11/1998 | Wark et al. |
| 6,327,761 | B1 | 12/2001 | Magnuson |
| 2009/0071944 | A1 | 3/2009 | Forlong |
| 2013/0264752 | A1* | 10/2013 | Magnuson ...................... 266/77 |

FOREIGN PATENT DOCUMENTS

| CN | 201783735 U | 8/2011 |
| DE | 3151308 A1 | 8/1983 |
| GB | 760061 | 10/1956 |

OTHER PUBLICATIONS

Communication dated Jul. 25, 2013 received from the European Patent Office enclosing the extended European Search Report for the European application No. 13162012-1702.

* cited by examiner

*Primary Examiner* — Scott Kastler
(74) *Attorney, Agent, or Firm* — Wood, Phillips, Katz, Clark & Mortimer

(57) ABSTRACT

A cutting apparatus embodying the principles of the present invention includes first and second cutting torches which can be selectively operated, depending upon the nature and thickness of a workpiece which is being cut. The cutting apparatus includes a pivotally moveable torch mounting plate on which each of the first and second torches is mounted, with the mounting plate in turn being rotatably moveable about a vertical main axis of the apparatus. The present apparatus provides significant savings, in that two individual torches, such as an oxy-acetylene gas torch and a plasma torch, can be mounted on the same mechanism for positioning to produce bevel and vertical cutting in materials having different thicknesses and/or cutting requirements at a significant savings in machine complexity.

16 Claims, 3 Drawing Sheets

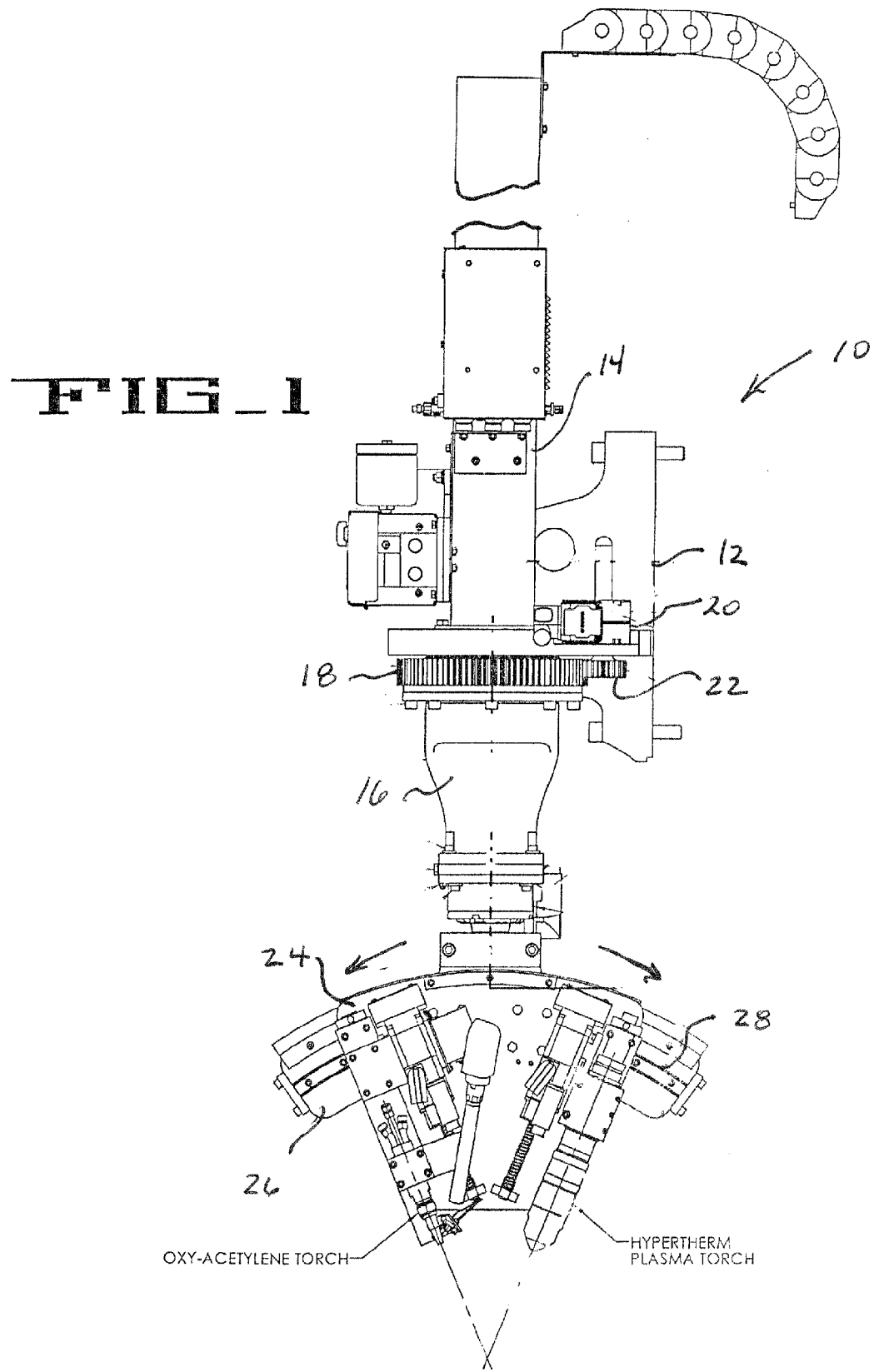

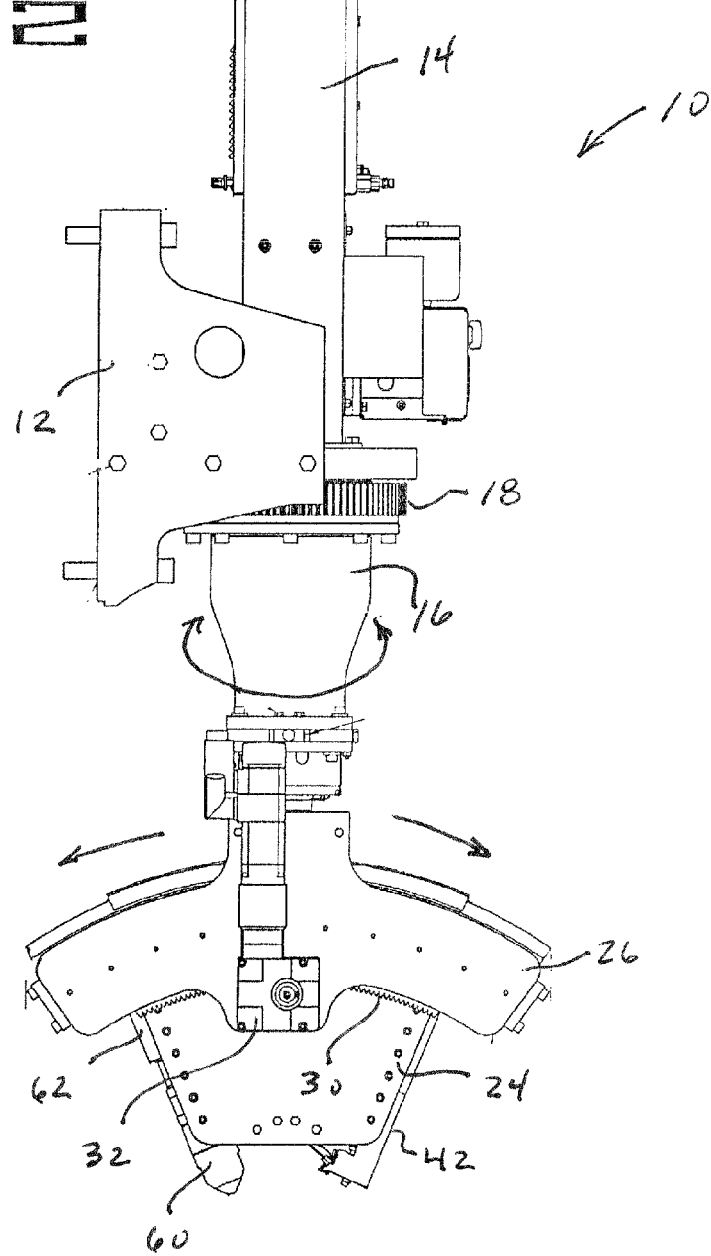

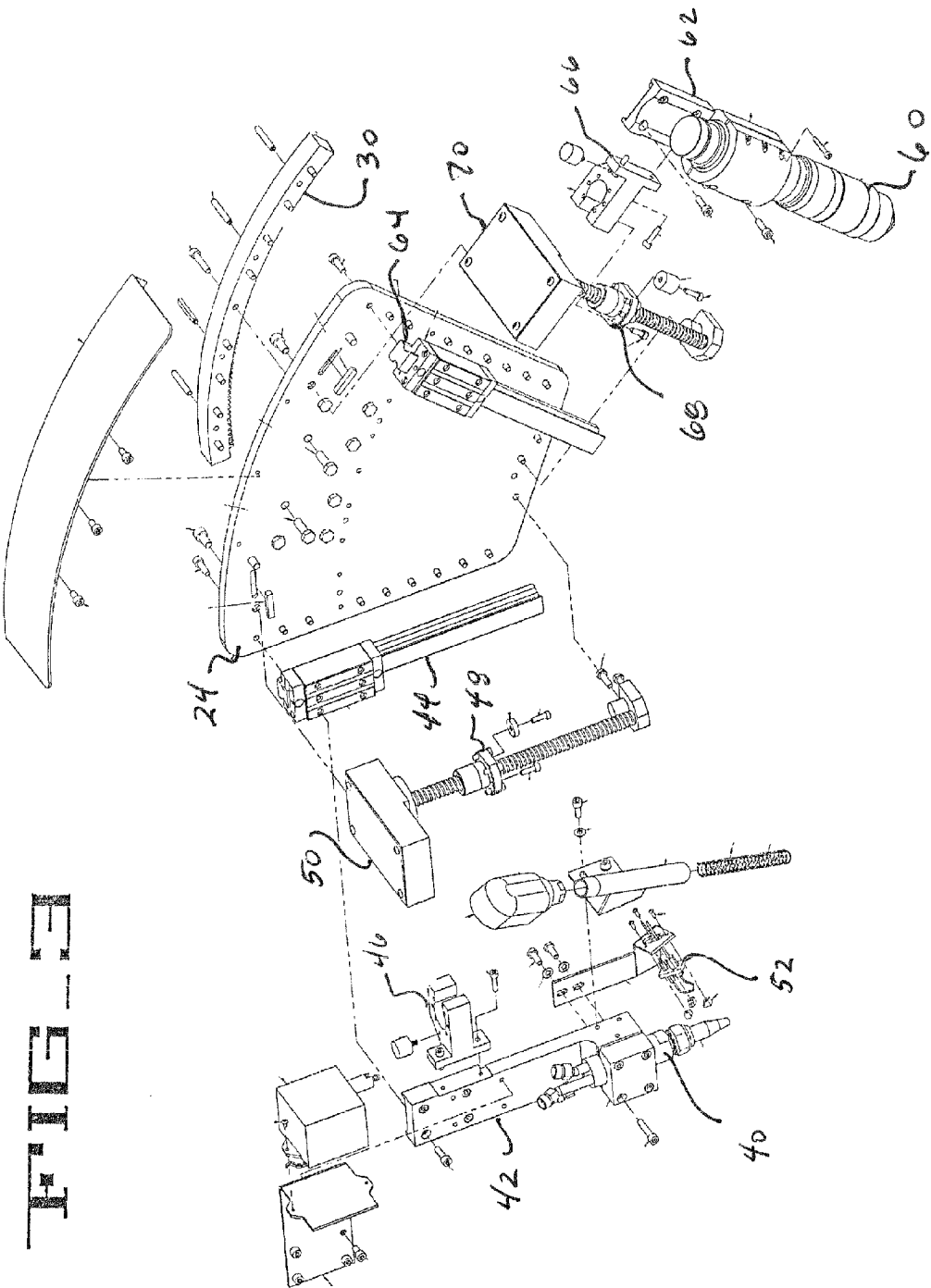

CUTTING APPARATUS WITH TWO TORCHES

TECHNICAL FIELD

The present invention relates generally to a cutting apparatus for cutting workpieces such as structural steel I-beams, channels, sheet stock, and the like, and more particularly a cutting apparatus having two individual cutting torches, which are selectively, independently operable, with the arrangement permitting mounting of the two torches on a single apparatus for precise positioning and movement of either selected torch with respect to an associated workpiece.

BACKGROUND OF THE INVENTION

The fabrication of structural components such as I-beams, flat stock, channels, and the like typically requires cutting, including beveling, of such structural components with suitable cutting torches. Because such components are frequently extremely heavy, and require careful positioning with respect to cutting devices during processing, various types of carriage devices have been developed, whereby such structural components can be carefully positioned with respect to associated cutting devices. Such arrangements may be configured to precisely position the structural workpiece and/or the cutting device in order to achieve the desired precision in component fabrication. By way of example, U.S. Pat. Nos. 5,256,212, and 5,787,556, both hereby incorporated by reference, disclose arrangements for cutting structural components and like workpieces.

Typically depending upon the thickness of the workpiece, either a plasma torch or an oxy-acetylene torch is used for cutting and/or beveling a workpiece. Ordinarily it is desired to take advantage of the speed at which a plasma torch can cut for plate thicknesses up to approximately a two inch maximum, while an oxy-acetylene (gas) torch is typically employed for its capacity to cut thicker plates, typically up to approximately six inches. The present invention is directed to a cutting apparatus having first and second cutting torches, typically, an oxy-acetylene torch, and a plasma torch. By mounting both of the torches on a single cutting apparatus, positioning mechanisms for positioning the torches and/or the associated workpiece can be commonly used when operating either torch, thereby achieving significant savings in an apparatus suitable for cutting a wide range of different workpieces.

SUMMARY OF THE INVENTION

A cutting apparatus embodying the principle of the present invention is configured to include first and second cutting torches which are selectively, independently operable for cutting an associated workpiece, with one torch or the other selected for operation, depending upon the specific cutting requirements for any given job. While certain aspects of the present apparatus permit selective, independent positioning of the two torches, common mounting of the torches on a single positioning apparatus permits either torch to be used with the same arrangement by which a workpiece is selectively positioned with respect to the cutting apparatus. Significant savings in both complexity and costs are achieved by avoiding the need to duplicate the positioning system for each of the two different types of cutting torches.

In accordance with the illustrated embodiment, the present cutting apparatus includes a main support frame which defines a main axis, typically a vertically extending main axis. The main support frame can be mounted for movement with an associated carriage or the like, for movement with respect to a workpiece, or can be mounted in a relatively fixed position, whereby an associated workpiece can be moved and positioned with respect to the cutting apparatus.

A rotatable torch support depends from and is mounted on the main support frame for rotation with respect thereto about the main axis.

A torch mounting plate, in turn, is mounted on and depends from the torch support for rotation therewith about the main axis relative to the main support frame. Notably, the torch mounting plate is pivotally moveable with respect to the torch support about a pivot axis that intersects the main axis at a right angle thereto.

In accordance with the present invention, a first cutting torch, preferably comprising an oxy-acetylene cutting torch, is mounted on the torch mounting plate. The first cutting torch is movable axially relative to the torch mounting plate along a first cutting axis that intersects the pivot axis. A second cutting torch, preferably comprising a plasma torch, is also mounted on the torch mounting plate. The second cutting torch is axially movable relative to the torch mounting plate along a second cutting axis that also intersects the pivot axis. Notably, the arrangement keeps the torch path location the same regardless of which torch is being operated. Thus, the torch path is the same when either beveling or vertical cutting. In other words, the X/Y location of the cut line does not change as the torches move from vertical to 45°, the typical maximum bevel angle for welding. This is accomplished by locating the pivot axis of the torch mounting plate, for beveling motion, at the bottom of the workpiece (that is, the machine passline). While this pivot location never changes, the arrangement by which each of the torches can be axially moved accommodates changes in the thickness of the workpiece material, since each torch can be individually moved higher or lower to keep the required standoff distance. As either torch in use is adjusted in height, the path it takes still intersects the X/Y torch path at the passline.

Thus, selective pivotal movement of the torch mounting plate, with respect to the torch support, permits selective positioning of a selected one of the first and second cutting torches for cutting the associated workpiece.

In order to facilitate rotational positioning of the rotatable torch support, and associated torch mounting plate, with respect to the main support frame about the main axis, a rotation gear is mounted on the torch support. A torch rotation motor drive, including a drive pinion in engagement of the rotation gear, provides for driven rotation of the torch support, and torch mounting plate, relative to the main support frame about the main axis. A curved gear rack, connected to the torch mounting plate, and a torch pivot motor drive in engagement with the curved gear rack, provides for driven pivotal movement of the torch mounting plate with respect to the torch support, about the pivot axis.

Other features and advantages of the present invention will become readily apparent from the following detailed description, the appended drawings, and the accompanying claims.

BRIEF DESCRIPTION OF THE DRAWINGS

FIG. 1 is a front elevational view of a cutting apparatus having two torches embodying the principles of the present invention;

FIG. 2 is a rear, elevational view of the present cutting apparatus; and

FIG. 3 is an exploded, perspective view of a pivotal torch mounting plate of the present cutting apparatus, and the two cutting torches mounted thereon.

DETAILED DESCRIPTION OF THE INVENTION

While the present invention is susceptible of embodiment in various forms, therein shown in the drawings and will hereinafter be described a presently preferred embodiment, with the understanding that the present disclose is to be considered as an exemplification of the invention, and is not intended to limit the invention to the specific embodiment illustrated.

With reference now to the drawings, therein is illustrated a cutting apparatus 10 having a pair of cutting torches, for cutting an associated workpiece, such as a structural I-beam, plate, channel, or like component. A principal object of the present invention is to share the use of positioning mechanisms for the two individual torches. By placing a plasma torch and a gas torch on the same mechanism for positioning to produce bevel cutting, or vertical cutting, a tremendous savings in complexity and cost can be achieved. The provision of two different types of torches is necessary in order to obtain the speed of a plasma torch for workpiece thicknesses that are within its capability, typically a two inch maximum, while providing an oxy-acetylene (gas) torch in order to have its capacity to cut, typically up to a six inch maximum. As will be appreciated, these typical cutting thicknesses are for the actual torch cut thickness. The maximum thickness for a 45-degree bevel cut for the gas torch would be approximately 4.24 inches.

Bevel cutting is done mainly for the purpose of preparing a workpiece for full penetration welds. The maximum bevel cut for welding is typically 45-degrees. Thus, each cutting torch of the apparatus needs to be able to tip to a 45-degrees angle from vertical, or at any needed angle less than 45-degrees.

In accordance with the illustrated embodiment, the present cutting apparatus 10 includes a main support frame 12 by which the cutting apparatus can be mounted on an associated workpiece handling arrangement. Such an arrangement may be configured for X/Y movement of the cutting apparatus 10, or may be arranged for maintaining the cutting apparatus in a fixed vertical position, while suitable conveyors or the like move an associated workpiece with respect to the cutting apparatus during processing. A power track 14 extends upwardly from the main support frame 12 for holding suitable electrical lines, gas supply lines, etc.

In order to provide rotational positioning of the cutting torches of the present apparatus, with respect to a vertically oriented main axis defined by the main support frame 12, cutting apparatus 10 includes a rotatable torch support 16 which is mounted on and depends from the main support frame 12. A rotation gear 18 is mounted on the torch support 16, with a torch rotation motor drive 20, including a drive pinion 22 in engagement with rotation gear 18, provided for driven rotation of the torch support about the main vertical axis of the apparatus.

In accordance with the present invention, cutting apparatus 10 includes first and second, independently operable cutting torches which are mounted on the torch support 16 for rotational movement therewith about the main vertical axis of the cutting apparatus 10. To this end, the cutting apparatus 10 includes a torch mounting plate 24 which is mounted on, and depends from the torch support 16. Notably, the torch mounting plate 24 is pivotally moveable with respect to the torch support 16 about a pivot axis which intersects the main vertical axis of the apparatus at a right angle.

To this end, the apparatus 10 includes a bearing mount 26 mounted on the torch support 16, with the bearing mount 26 having a bearing 28 which carries the torch mounting plate 24 for pivotal movement with respect to the bearing mount, and the torch support 16.

A curved gear rack 30 is connected to torch mounting plate 24, with a torch motor drive 32 (FIG. 2) provided in engagement with the curved rack 30 for driven pivotal movement of the torch mounting plate 24 with respect to the torch support 16 about the pivot axis of the torch mounting plate. Thus, the torch mounting plate 24 can be rotated, together with torch support 16, about the main vertical axis of the apparatus, while the torch mounting plate 24 can be selectively pivotally positioned, about the pivot axis, with respect to the torch support 16.

The first and second cutting torches of the cutting apparatus 10 are mounted on the torch mounting plate 24 for rotational and pivotal movement therewith. With particular reference to FIG. 3, a first cutting torch 40, preferably comprising an oxy-acetylene (gas) cutting torch, is provided, and is mounted on a moveable first carriage 42. First carriage 42 is mounted for reciprocal, linear movement, on a first guide rail 44 mounted on torch mounting plate 24. The first carriage 42 is operatively connected by a bracket 46 to a ball screw nut 48 mounted on a lead screw of a first torch adjustment drive 50 mounted on torch mounting plate 24 (drive motor not shown). Thus, by suitable operation of torch adjustment drive 50, first cutting torch 40 can be selectively positioned and axially moved along a first cutting axis, that intersects the pivot axis of the torch mounting plate, as the ball screw nut moves along the lead screw of the torch adjustment drive, thereby moving carriage 42 linearly along guide rail 44. An igniter 52, is mounted on the carriage 42 for movement therewith, so that the igniter remains in the proper position with respect to the first cutting torch 40. An ultraviolet scanner 53 is positioned in operative association with the first cutting torch 40 to monitor its operation.

A second cutting torch 60 of the present cutting apparatus, preferably comprising a plasma torch, is similarly mounted on the torch mounting place 24 for axial movement along a second cutting axis that intersects the pivot axis of the torch mounting place. Second cutting torch 60 is mounted on a carriage 62, which in turn is mounted on a second guide rail 64 mounted on torch cutting plate 24. A bracket 66 connects the carriage 62 to a ball screw nut 68 which is moveable along the lead screw of a second torch adjustment drive 70, also mounted on torch mounting plate 24. Thus, selective operation of second torch adjustment drive 70 selectively positions the second cutting torch 60 along the guide rail 64, whereby the cutting torch can be selectively axially moved along its second cutting axis. The first and second cutting axes converge in a downward direction.

From the foregoing, operation of the present cutting apparatus 10 will be readily appreciated. Rotational positioning of the first and second cutting torches 40 and 60, with respect to the main vertical axis of the apparatus, can be effected by driven rotational movement of torch support 16 by operation of motor drive 20. Selective positioning of either one of the first and second cutting torches, with respect to the torch support 16, can be effected by driven, pivotal movement of torch mounting plate 24 with respect to the torch support 16 by operation of motor drive 32.

This rotational and pivotal positioning of either selective one of the cutting torches provides versatile operation of the present apparatus. As noted, the present apparatus keeps the torch path location the same for either the first or second cutting torch. This same torch path is used for either beveling, or vertical cutting. In other words, the X/Y location of the cut line does not change as the torches move from vertical to 45-degrees, the typical angle at which a workpiece may be cut for beveling. This is achieved by locating the pivot axis of the torch mounting plate, which provides the beveling motion, at the bottom of the material of the workpiece, that is, at the machine passline. Notably, this pivot location does not change. As changes in material thickness require a variation in the standoff distance for each of the torches, the torches can be individually moved higher, along their respective first and second cutting axes, as to maintain the proper standoff distance. As the torch in use is adjusted in height, its path of operation still intersects the X/Y torch path at the passline.

In the illustrated embodiment, the first and second torches are fixed at an angle, with respect to each other, of about 20-degrees. This angle is "arbitrary" in the sense that it is not important to the actual bevel angle that is being produced. However, the angle of importance is the angle on the outside of the torch in use relative to the plate surface. The angle between the torches is kept to a minimum in order to effect vertical cutting with either selected torch, while the unused torch is not positioned at such a large angle as to interfere with the workpiece or the associated machine mechanism.

As will be appreciated, as the torch path changes direction, the bevel cutting angle needs to remain at a right angle to the direction of travel. This is accomplished by rotating the entire beveling mechanism, including the torch support 16, the torch mounting plate 24, and the first and second torches 40 and 60. The rotation provided by motor drive 20 permits 360-degrees of rotation about the main vertical axis of the apparatus. Notably, this allows the cutting apparatus to bevel a circular or rectangular path without stopping. When starting a new path with the desired bevel, the rotational axis is rotated so by the end of the new path, the torch in operation has not "over wound" the gas and electrical leads that attach to the cutting mechanism. This can easily be achieved through suitable programming of the electronic controls for the apparatus.

Another versatile feature of the present apparatus is the use of the beveling function to actually achieve a vertical cut, by tipping the torch that is in operation to a few degrees from vertical. In particular, plasma torches usually have a kerf angle of a few degrees on one side of cutting, and typically an even larger angle (5 degrees) typically, on the other side of the cut. If the torch is tipped in the opposite direction of the kerf angle, the kerf angle can be substantially eliminated, thus forming a more vertically oriented cut.

Another problem typically associated with both plasma and gas torches occurs when changing direction, in that the bottom of a cut that is being formed will "trail" behind the top of the cut, thereby undesirably creating an angled cut. If the cut speed is decreased the resultant kerf will be more vertically oriented. However, this naturally increases the process time, thereby increasing the cost of workpiece fabrication. However, the present apparatus permits the torch in operation to be tipped from vertical to compensate for the turning effect, whereby the cut will be more vertically oriented, improving the quality of the workpiece, and increasing the speed at which the cutting apparatus can travel while turning the torch path.

Thus, by using the two selectively operable torches of the present invention, a total of 4-axis motion can be shared by the two individual torches. Significant savings in machine complexity, and resultant costs, are desirably achieved.

From the foregoing, it will be observed that numerous modifications and variations can be effected without departing from the turn spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. An apparatus for cutting a workpiece, comprising:
   a main support frame defining a main axis extending through the main support frame;
   a torch mounting plate mounted on and depending from said support frame, said torch mounting plate being pivotally movable about a pivot axis that intersects said main axis at a right angle thereto;
   a first cutting torch mounted on said torch mounting plate; and
   a second cutting torch mounted on said torch mounting plate,
   said torch mounting plate being selectively movable about said pivot axis to selectively position a selected one of said first and second cutting torches for cutting said workpiece.

2. An apparatus for cutting a workpiece in accordance with claim 1, wherein,
   said first cutting torch is axially movable relative to said torch mounting plate along a first cutting axis that intersects said pivot axis; and
   said second cutting torch is axially movable relative to said torch mounting plate along a second cutting axis that intersects said pivot axis.

3. An apparatus for cutting a workpiece in accordance with claim 1, wherein,
   said torch mounting plate is rotatable about said main axis relative to said support frame.

4. An apparatus for cutting a workpiece in accordance with claim 1, including
   a rotatable torch support depending from and mounted on said main support frame for rotation with respect thereto about said main axis, said torch mounting plate being mounted on said torch support for rotation therewith relative to said main support frame, said torch mounting plate being pivotal with respect to torch support about said pivot axis, and a rotation gear mounted on said torch support for driven rotation of said torch support, and said torch mounting plate, relative to said main support frame about said main axis.

5. An apparatus for cutting a workpiece in accordance with claim 4, including
   a curved gear rack connected to said torch plate for driven pivotal movement of said torch plate with respect to said torch support about said pivot axis.

6. An apparatus for cutting a workpiece, comprising:
   a main support frame defining a main axis extending through the main support frame;
   a rotatable torch support depending from and mounted on said main support frame for rotation with respect thereto about said main axis;
   a torch mounting plate mounted on and depending from said torch support for rotation therewith about said main axis relative to said main support frame, said torch mounting plate being pivotally movable with respect to said torch support about a pivot axis that intersects said main axis at a right angle thereto;
   a first cutting torch mounted on said torch mounting plate, said first cutting torch being axially movable relative to said torch mounting plate along a first cutting axis that intersects said pivot axis; and
   a second cutting torch mounted on said torch mounting plate, said second cutting torch is axially movable relative to said torch mounting plate along a second cutting axis that intersects said pivot axis, said torch mounting plate being selectively movable about said pivot axis to selectively position a selected one of said first and second cutting torches for cutting said workpiece.

7. An apparatus for cutting a workpiece in accordance with claim 6, including
   a first torch guide rail mounted on said torch mounting plate for guiding axial movement of said first cutting torch along said first cutting axis that intersects said pivot axis, and a first torch motor drive for selectively positioning said first cutting torch along said first guide rail, and
   a second torch guide rail mounted on said torch mounting plate for guiding movement of said second cutting torch a second cutting axis that intersects said pivot axis, and a second torch motor drive for selectively positioning said second cutting torch along said second guide rail.

8. An apparatus for cutting a workpiece in accordance with claim 6, including
   a rotation gear mounted on said torch support, and a torch rotation motor drive including a drive pinion in engagement with said rotation gear for driven rotation of said torch support, and said torch mounting plate, relative to said main support frame about said main axis.

9. An apparatus for cutting a workpiece in accordance with claim 6, including
   a curved gear rack connected to said torch mounting plate, and a torch pivot motor drive in engagement with said curved gear rack for driven pivotal movement of said torch mounting plate with respect to said torch support about said pivot axis.

10. An apparatus for cutting a workpiece in accordance with claim 6, wherein
    said first cutting torch comprised an oxy-acetylene torch, and said second cutting torch comprises a plasma torch.

11. An apparatus for cutting a workpiece in accordance with claim 7, including
    an igniter mounted on said torch plate in operative association with said oxy-acetylene torch.

12. An apparatus for cutting a workpiece in accordance with claim 6, wherein
    said first and second cutting torches are mounted on said torch mounting plate for respective movement along said first and second torch axes, wherein said first and second torch axes are arranged at an acute angle to each other.

13. An apparatus for cutting a workpiece in accordance with claim 1, wherein
    the main axis is a vertical axis and the pivot axis is located below the torch mounting plate.

14. An apparatus for cutting a workpiece in accordance with claim 13 wherein
    the first and second cutting torches are axially movable relative to the torch mounting plate respectively along first and second cutting axes.

15. An apparatus for cutting a workpiece in accordance with claim 14 wherein
    the first and second cutting axes converge in a downward direction.

16. An apparatus for cutting a workpiece in accordance with claim 1 wherein
    the pivot axis is spaced from the mounting plate.

* * * * *